United States Patent
Willems

(10) Patent No.: US 9,080,649 B2
(45) Date of Patent: Jul. 14, 2015

(54) ELECTROMECHANICAL DAMPER

(71) Applicant: Audi AG, Ingolstadt (DE)

(72) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/201,266

(22) Filed: Mar. 7, 2014

(65) Prior Publication Data

US 2014/0256501 A1    Sep. 11, 2014

(30) Foreign Application Priority Data

Mar. 8, 2013    (DE) .......................... 10 2013 004 012

(51) Int. Cl.
| F16H 37/06 | (2006.01) |
| F16H 1/46  | (2006.01) |
| B60G 13/14 | (2006.01) |
| F16F 15/03 | (2006.01) |
| H02K 7/116 | (2006.01) |
| H02K 7/18  | (2006.01) |

(52) U.S. Cl.
CPC ...... *F16H 1/46* (2013.01); *B60G 13/14* (2013.01); *F16F 15/03* (2013.01); *F16F 15/035* (2013.01); *H02K 7/116* (2013.01); *H02K 7/1853* (2013.01); *B60G 2202/22* (2013.01); *B60G 2204/419* (2013.01); *B60G 2204/4191* (2013.01); *B60G 2204/421* (2013.01); *B60G 2300/60* (2013.01)

(58) Field of Classification Search
None
See application file for complete search history.

(56) References Cited

U.S. PATENT DOCUMENTS

| 2,450,290    | A   |   7/1947 | Maxwell |
| 7,105,964    | B2* |   9/2006 | Miyazaki et al. ........... 310/75 R |
| 7,530,912    | B2* |   5/2009 | Kramer ............................. 475/5 |
| 8,573,604    | B2* |  11/2013 | Willems ........................ 280/5.5 |
| 2002/0140302 | A1  |  10/2002 | Hsu |
| 2012/0104883 | A1* |   5/2012 | Burns et al. ..................... 310/54 |
| 2013/0049508 | A1  |   2/2013 | Willems |
| 2013/0154277 | A1  |   6/2013 | Willems |
| 2013/0320791 | A1  |  12/2013 | Willems |
| 2014/0300072 | A1* |  10/2014 | Willems ..................... 280/124.1 |

FOREIGN PATENT DOCUMENTS

| DE | 26 24 374     |     | 12/1977 |
| DE | 34 44 420     |     |  6/1986 |
| DE | 197 14 225    | A1  | 10/1998 |
| DE | 101 15 858    | A1  | 10/2002 |
| DE | 10 2005 043 426 |   |  3/2007 |
| DE | 102009048818  |     |  4/2011 |
| DE | 10 2010 035 087 |   |  2/2012 |
| DE | 102010035088  |     |  3/2012 |

(Continued)

*Primary Examiner* — Dirk Wright
(74) *Attorney, Agent, or Firm* — Henry M. Feiereisen LLC

(57) ABSTRACT

An electromechanical damper for a vehicle for damping between two components mechanical oscillations by which a drive torque is transmittable to an electric generator for generating a damping force includes first and second gearboxes in the form of planetary gear trains, each having a sun wheel, with the sun wheels being connected to end faces of a rotor of the generator, respectively. A stator housing forms a gear element which is integrated in the first and second gearboxes. The sun wheel, ring gear and planet wheels of the first and second gearboxes are each provided with helical teeth in axial direction, with the helical teeth of the sun wheel of one of the first and second gearboxes and the sun wheel of the other one of the first and second gearboxes being directed in opposition to one another.

9 Claims, 2 Drawing Sheets

(56) References Cited

FOREIGN PATENT DOCUMENTS

| DE | 102011009608 | 8/2012 |
|---|---|---|
| DE | 10 2011 006 094 | 9/2012 |
| EP | 0 118 012 | 9/1984 |
| EP | 1 935 679 | 6/2008 |
| JP | 56140545 A | 11/1981 |
| JP | 3227713 A | 10/1991 |
| JP | 2000-297850 | 10/2000 |
| KR | 1020120064846 | 6/2012 |

* cited by examiner

ELECTROMECHANICAL DAMPER

CROSS-REFERENCES TO RELATED APPLICATIONS

This application claims the priority of German Patent Application, Serial No. 10 2013 004 012.4, filed Mar. 8, 2013, pursuant to 35 U.S.C. 119(a) -(d), the disclosure of which is incorporated herein by reference in its entirety as if fully set forth herein.

BACKGROUND OF THE INVENTION

The present invention relates to an electromechanical damper for a motor vehicle for damping between two components mechanical oscillations by which a drive torque is transmittable to an electric generator for generating a damping force.

The following discussion of related art is provided to assist the reader in understanding the advantages of the invention, and is not to be construed as an admission that this related art is prior art to this invention.

An electromechanical damper may substitute a hydraulic damper in a mechanical system of a motor vehicle, where the mechanical system can oscillate. Like the hydraulic damper, the electromechanical damper draws from the oscillating system energy which, however, is not converted to thermal energy. Rather the oscillation energy is used to drive a generator which is operably connected to the electromechanical damper and converts the oscillation energy to electric energy that can be fed to the on-board electrical system of the motor vehicle.

It would be desirable and advantageous to provide an improved electromechanical damper which obviates prior art shortcomings and is capable to realize a substantially play-free force transmission.

SUMMARY OF THE INVENTION

According to one aspect of the present invention, an electromechanical damper for a vehicle for damping between two components mechanical oscillations by which a drive torque is transmittable to an electric generator for generating a damping force, includes a first gearbox constructed in the form of a planetary gear train having a sun wheel connected to one end face of a rotor of the generator, a ring gear, and planet wheels in mesh with the sun wheel and the ring gear, a second gearbox constructed in the form of a planetary gear train having a sun wheel connected to another end face of the rotor, a ring gear, and planet wheels in mesh with the sun wheel and the ring gear, and a stator housing forming a gear element which is integrated in the first and second gearboxes, wherein the sun wheel, ring gear and planet wheels of the first and second gearboxes are each provided with helical teeth in axial direction, with the helical teeth of the sun wheel of one of the first and second gearboxes and the sun wheel of the other one of the first and second gearboxes being directed in opposition to one another.

The provision of helical teeth results in a continuous contact between tooth flanks and has less play compared to a gearbox with straight teeth. In addition, acoustic behavior of helical teeth is improved. Due to the oppositely directed helical teeth between the sun wheels of the first and second gearboxes, axial forces are compensated by the helical teeth in the absence of additional bearing loads. The axial force is no longer effective since the helical teeth on the sun wheels are oriented in opposition to one another.

According to another advantageous feature of the present invention, the helical teeth can be oriented at an angle of about 45° in relation to the axial direction of the gears of the gearboxes. In this way, efficiency is enhanced by the compensation of the axial force as a result of the helical teeth.

According to another advantageous feature of the present invention, the first and second gearboxes can be arranged on both sides of the generator. When the rotor of the generator is connected on both end faces with the sun wheel of a gearbox with helical teeth, forces are advantageously introduced into the generator in symmetry or are evenly dispersed.

According to another advantageous feature of the present invention, the ring gear of the first gearbox and the ring gear of the second gearbox can form jointly with the stator housing a single-piece structure, with the planet wheels of the first and second gearboxes forming input elements via which drive torques are introduced into the first and second gearboxes. In this way, the overall construction saves space as the radially outer ring gears of both gearboxes form a unitary structure.

According to another advantageous feature of the present invention, the stator housing can be integrated as a gear element in the first gearbox and as a gear element in the second gearbox. Such a configuration provides for a further reduction of installation space to render the overall construction very compact. The rotational movement of the stator is thereby transmitted via the gearboxes to the rotor of the generator.

According to another advantageous feature of the present invention, the stator housing can be connected in fixed rotative engagement with a first component for introducing oscillations into the damper. Advantageously, the planet carriers for respectively supporting the planet wheels of the first and second gearboxes can be connected in fixed rotative engagement with the second component. As a result, forces can be introduced undamped into the damper so that any loss of energy is minimized.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
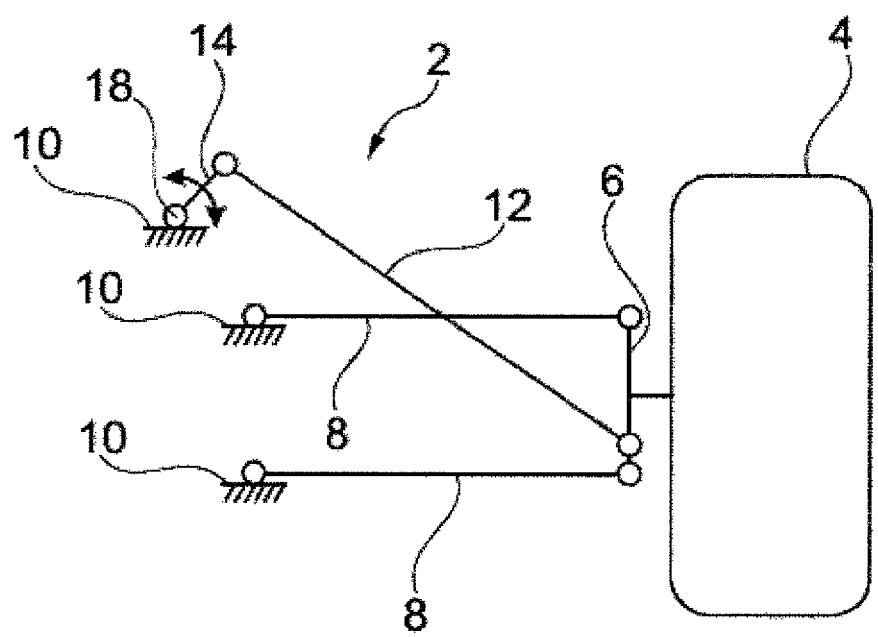
FIG. 1 is a schematic illustration of a wheel suspension of a vehicle wheel.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a wheel suspension 2 for a vehicle wheel 4 of a motor vehicle. The vehicle wheel 4 is rotatably mounted to a wheel carrier 6. The wheel carrier 6 is linked via a transverse control arm to a vehicle body 10. In addition, a semi-trailing arm 12 acts on the wheel carrier 6. The semi-trailing arm 12 is connected via a coupler 14 and an electromechanical damper 18 with the vehicle body 10.

Figure 2:
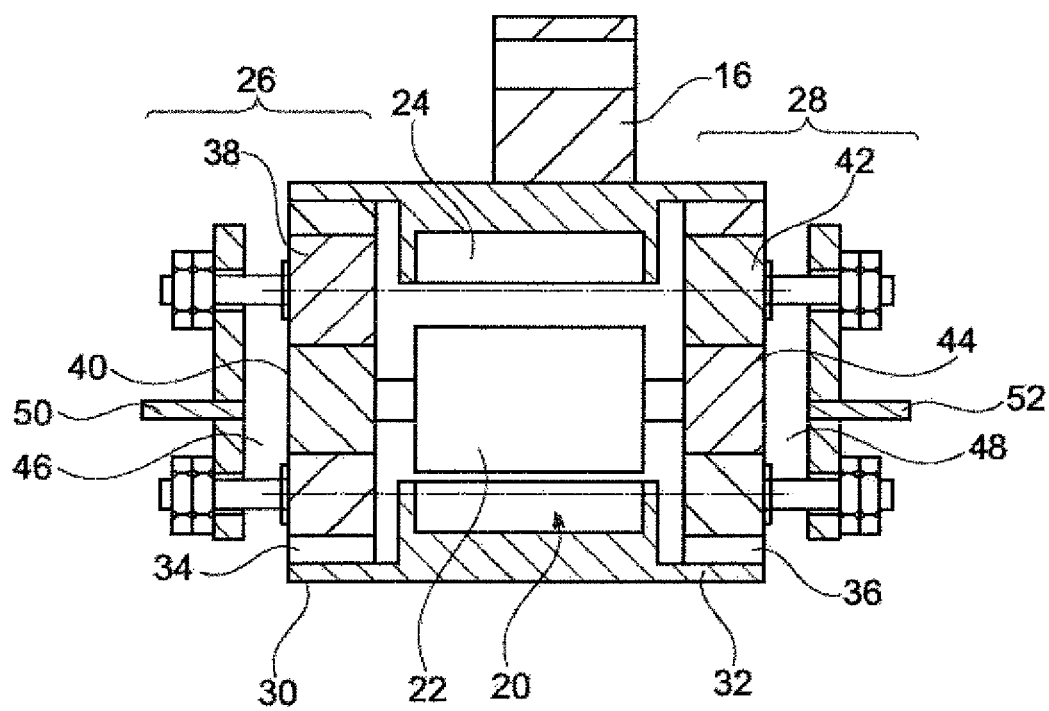
FIG. 2 is a schematic sectional illustration of an electromechanical damper according to the present invention which is mounted to a vehicle body.

FIG. 2 shows a link member 16 which is secured to the coupler 14 and is rotatably mounted in the electromechanical damper 18. The electromechanical damper 18 has a radially outer stator housing 20 and a rotor 22 which interacts with the stator housing 20. The stator housing 20 has an inner side which supports a stator winding 24 which interacts with a not shown electromagnet in the rotor 22.

As shown in FIG. 2, the stator housing 20 is connected in driving relationship with the rotor 22 via two gearboxes 26, 28. The stator housing 20 is extended on both sides by a ring gear 30 and 32, respectively. The ring gears 30, 32, which have a diameter which is greater than a diameter of the stator winding 24, abut the stator housing 20 in axial direction and form torque input elements of the gearboxes 26, 28 which are configured as planetary gear trains.

In the gearbox 26, the ring gear 30 is in mesh with its internal teeth 34 with planet wheels 38, of which only one planet wheel 38 is shown here. The planet wheels 38 in turn are in mesh with a sun wheel 40 which is connected to the rotor 22 in coaxial relationship to a rotation axis of the rotor 22. The planet wheels 38 of the first gearbox 26 are rotatably mounted to a planet carrier 46 which in turn is connected in fixed rotative engagement with a stationary bracket (not shown) that is mounted to the vehicle body 10.

The sun wheel 40 of the first planetary gearbox 26 is supported in fixed rotative engagement by an end of a shaft on the left-hand side of FIG. 2, whereas a sun wheel 44 of the second gearbox 38 is formed onto the end of the shaft on the right-hand side of FIG. 2. As described above, the gearbox 28, like the gearbox 26, is also configured as planetary gear train having planet wheels 42, of which only one planet wheel 42 is shown here. The planet wheels 42 are in mesh radially outside with internal teeth 36 of the ring gear 32 of the stator housing 20, with the ring gear 32 being firmly mounted to the vehicle body 20.

A web 52 of the gearbox 28 is connected to the planet wheels 42 and forms jointly with a web 50 of the gearbox 26 the torque output element of the damper 18.

The link member 16 is connected to the stator housing 20 which in turn forms a single-piece structure with the ring gears 30, 32 of the gearboxes 26, 28 on opposite end faces of the stator housing 20. The planet wheels 38, 42 are driven by the ring gears 30, 32, and the sun wheels 40, 44 are driven on .the rotor 22 by the planet wheels 38, 42.

The ring gears 30, 32, the planet wheel 38, 42, and the sun wheels 40, 44 of the gearboxes 26, 28 are each provided with helical teeth which are oriented in oblique relationship to the axial direction, with the helical teeth of the two sun wheels 40, 44 being directed in opposition to one another.

During travel of the vehicle, the link member 16 is acted upon by mechanical oscillations which cause rotational oscillations of the link member 16 in relation to the pivot axis. These rotational oscillations drive the stator with drive torques which are introduced into the gearboxes 26, 28 via the ring gears 30, 32. The ratio of multiplication of the gearboxes 26, 28 is hereby dimensioned such that an adequate rotor speed is realized for an effective voltage induction, even when the mechanical oscillations are small or long-wave.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. An electromechanical damper for a vehicle for damping between two components mechanical oscillations by which a drive torque is transmittable to an electric generator for generating a damping force, said damper comprising:
    a first gearbox constructed in the form of a planetary gear train having a sun wheel connected to one end face of a rotor of the generator, a ring gear, and planet wheels in mesh with the sun wheel and the ring gear;
    a second gearbox constructed in the form of a planetary gear train having a sun wheel connected to another end face of the rotor, a ring gear, and planet wheels in mesh with the sun wheel and the ring gear; and
    a stator housing forming a gear element which is integrated in the first and second gearboxes,
    wherein the sun wheel, ring gear and planet wheels of the first and second gearboxes are each provided with helical teeth in axial direction, with the helical teeth of the sun wheel of one of the first and second gearboxes and the sun wheel of the other one of the first and second gearboxes being directed in opposition to one another,
    wherein the ring gear of the first gearbox and the ring gear of the second gearbox form jointly with the stator housing a single-piece structure, with the planet wheels forming input elements of the first and second gearboxes via which input elements drive torques are introduced into the first and second gearboxes.

2. The electromechanical damper of claim 1, wherein the helical teeth are oriented at an angle of about 45° in relation to the axial direction.

3. The electromechanical damper of claim 1, wherein the first and second gearboxes are arranged on both sides of the generator.

4. An electromechanical damper for a vehicle for damping between two components mechanical oscillations by which a drive torque is transmittable to an electric generator for generating a damping force, said damper comprising:
    a first gearbox constructed in the form of a planetary gear train having a sun wheel connected to one end face of a rotor of the generator, a ring gear, and planet wheels in mesh with the sun wheel and the ring gear;
    a second gearbox constructed in the form of a planetary gear train having a sun wheel connected to another end face of the rotor, a ring gear, and planet wheels in mesh with the sun wheel and the ring gear; and
    a stator housing forming a pear element which is integrated in the first and second gearboxes,
    wherein the sun wheel, ring gear and planet wheels of the first and second gearboxes are each provided with helical teeth in axial direction with the helical teeth of the sun wheel of one of the first and second gearboxes and the sun wheel of the other one of the first and second gearboxes being directed in opposition to one another,
    wherein the stator housing is connected in fixed rotative engagement with a coupler, which is linked to the damper, for introducing oscillations into the damper.

5. The electromechanical damper of claim 4, wherein the helical teeth are oriented at an angle of about 45° in relation to the axial direction.

6. The electromechanical damper of claim 4, wherein the first and second gearboxes are arranged on both sides of the generator.

7. An electromechanical damper for a vehicle for damping between two components mechanical oscillations by which a drive torque is transmittable to an electric generator for generating a damping force, said damper comprising:

a first gearbox constructed in the form of a planetary gear train having a sun wheel connected to one end face of a rotor of the generator, a ring gear, and planet wheels in mesh with the sun wheel and the ring gear;

a second gearbox constructed in the form of a planetary gear train having a sun wheel connected to another end face of the rotor, a ring gear, and planet wheels in mesh with the sun wheel and the ring gear: and a stator housing forming a gear element which is integrated in the first and second gearboxes, wherein the sun wheel, ring gear and planet wheels of the first and second gearboxes are each provided with helical teeth in axial direction, with the helical teeth of the sun wheel of one of the first and second gearboxes and the sun wheel of the other one of the first and second gearboxes being directed in opposition to one another, wherein each of the first and second gearboxes has a planet carrier for supporting the planet wheels, and further comprising a connection element placed between the first and second gearboxes and connected to a vehicle body, said planet carriers of first and second gearboxes being connected in fixed rotative engagement with the connection element.

8. The electromechanical damper of claim 7, wherein the helical teeth are oriented at an angle of about 45° in relation to the axial direction.

9. The electromechanical damper of claim 7, wherein the first and second gearboxes are arranged on both sides of the generator.

\* \* \* \* \*